United States Patent Office
2,822,340
Patented Feb. 4, 1958

2,822,340
FLAME RESISTANT POLYESTER RESINOUS COMPOSITIONS CONTAINING COMBINED HALOGENS AND PHOSPHOROUS AND CERTAIN ALKALINE EARTH METAL SALTS AND THE PROCESS OF PREPARING THE SAME

John David McGovern, Norwalk, Conn., and George Bliss Duhnkrack, Harrison, N. Y., assignors to American Cyanamid Company, New York, N. Y., a corporation of Maine No Drawing. Application October 12, 1955
Serial No. 540,173

15 Claims. (Cl. 260—22)

This invention relates to a clear, light and heat stabilized flame-resistant, self-extinguishing resinous composition. Further, this invention relates to a light- and heat-stable flame-resistant, self-extinguishing resinous composition, its method of production and products produced therefrom.

The production of flame-resistant resinous compositions is desired, inasmuch as said compositions find many uses, as for example, in molded and laminated articles as in decorative and structural applications. Resinous compositions also find many uses in certain instances where other materials cannot be used. It is readily apparent, therefore, that a flame- and heat- and weather-resistant resinous composition is desirable and would find immediate employment in the art. Since resinous compositions are primarily hydrocarbon materials, they are often readily flammable. They are, furthermore, subject to discoloration from exposure to the atmosphere. Therefore, many attempts have been made to produce stable resinous compositions that are both flame resistant and stable against becoming discolored from heat, light, moisture, etc., to which these compositions may be exposed.

We have found that resinous compositions which contain halogens, to impart flame-resistance, have a tendency to discolor badly from heat and from weathering conditions of the exposed atmosphere. Obviously, when the material is employed in an internal or hidden application not exposed to view, it is not important that the material be free from these discoloring effects. However, when the material finds use, as for example, in transparent and translucent application where appearance is paramount, such as in corrugated glass-filled structural pieces for walls and ceilings, it is desired that the material be water-clear when produced and also that the material retain this clearness after prolonged exposure to moisture, heat, sunlight, etc. We have found that the resistance to discoloration of the resinous compositions according to the teachings of our invention is greatly improved by the addition thereto of a small amount of salt or mixture thereof, selected from the alkaline metal salts of fatty acids containing from 8 to 20 carbon atoms.

The resinous compositions prepared in accordance with our invention are polymerizable unsaturated polyester resinous materials. Further, the resinous compositions prepared in accordance with our invention are polymerizable unsaturated resinous materials which are copolymerizable with a compound containing a polymerizable $CH_2=C<$ group and having a boiling point of at least 60° C.

It is an object of our invention to produce a clear weather- and flame-resistant, self-extinguishing polyester resinous composition. It is a further and more specific object of our invention to produce a heat-, light-, and weather-stable, flame-resistant unsaturated polyester resinous composition that may be polymerized with a compound containing a polymerizable $CH_2=C<$ group. These and other objects of my invention will be discussed more fully hereinbelow.

As is well known in the art, conventional polymerizable unsaturated polyester resins, such as those prepared by reacting an ethylenically unsaturated polycarboxylic acid with a polyhydric aliphatic alcohol in admixture with a polymerizable compound containing a polymerizable $CH_2=C<$ group, are extremely useful as resinous compositions, particularly in the field of molding, casting and laminating. These compositions, generally speaking, are not fire-resistant as such. In order to obtain a fire-resistant material, it has been necessary to introduce physically other compounds into the composition. In a copending application by Lennart A. Lundberg, Serial No. 360,839, filed June 10, 1953, a flame-resistant, self-extinguishing light-stable polyester resinous composition and method of making is disclosed. In the composition therein disclosed fire-resistance depends on combining in the polyester resins sufficient amounts of halogenated reactants to provide from about 5 to 50% by weight of chlorine, bromine, and iodine in the form of halogenated polyhydric alcohols or halogenated polycarboxylic acids together with alkyl phosphates as hereinafter more fully described. The halogens employed are those having an atomic weight greater than 35, namely chlorine, bromine, and iodine. Light stability is found to depend upon incorporating in the polyester from about 0.01% to about 5%, preferably from 0.1% to 2% by weight based on the total weight of polyester-monomer composition of a benzophenone compound having the formula:

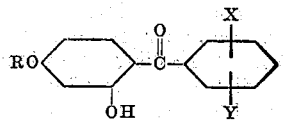

wherein "R" is an alkyl group having between 1 and 4 carbon atoms, "X" is an alkyl group containing between 1 and 4 carbon atoms or an alkoxy group containing between 1 and 4 carbon atoms, or hydrogen or halogen group, and "Y" is an alkyl group containing between 1 and 4 carbon atoms or an alkoxy group containing between 1 and 4 carbon atoms or hydrogen or a halogen group or a hydroxyl group based on the total weight of the polyester resin solids and the weight of the monomeric material containing the polymerizable $CH_2=C<$ group may be added.

The preparation of the polymerizable unsaturated polyester resins utilizing halogenated polycarboxylic acids and polyhydric alcohols is carried out exactly as if the reactants were unhalogenated. In the preparation of the polymerizable unsaturated polyester resinous compositions of the present invention, one may make use of the ethylenically unsaturated polycarboxylic acids, such as maleic, fumaric, aconitic, itaconic, and the like. The ethylenically unsaturated polycarboxylic acids include those known as the alpha, beta unsaturated acids. These unsaturated acids should be present in an amount approximating at least 20% by weight of the total weight of the polycarboxylic acids used and preferably in amounts varying between about 25% and 65% by weight based on the total weight of polycarboxylic acid present. If it is desired to make use of polycarboxylic acids, which are free of non-benzenoid unsaturation, one could use such acids as phthalic, malonic, succinic, glutaric, sebacic, and the like, but in amounts correspondingly in proportion to the total amount of polycarboxylic acid present. Whenever available, the anhydrides of these acids may be used, e. g., maleic anhydride, phthalic anhydride, and as used herein, polycarboxylic acids include the polycarboxylic anhydrides when available. Also, mixtures of the acids and anhydrides may be used in the preparation of the polyester resin. Illustrative examples of halogenated polycarboxylic acids and anhydrides thereof that may be used in our invention are bromofumaric acid, chlorofumaric acid, bromomaleic acid, chloromaleic acid; dibromomaleic acid; chloromaleic anhydride; dibromomaleic anhydride, dichloromaleic anhydride, bromomalonic acid, chloromalonic acid, dibromomalonic acid, bromosuccinic acid, alpha, beta-dibromosuccinic acid, alpha, beta-diiodosuccinic acid, alpha, beta-dichlorosuccinic acid, alpha, beta-dichlorosuccinic anhydride, 3-bromophthalic acid; 4-chlorophthalic acid; 3,4-dibromophthalic acid; 3,6-dichlorophthalic acid; tetrachlorophthalic acid; 3-bromophthalic anhydride; 4-chlorophthalic anhydride; 3,6-dibromophthalic anhydride; 3,6-dichlorophthalic anhydride; 4,5-dichlorophthalic anhydride; tetrachlorophthalic anhydride; dibromosebacic acid; hexachloroendomethylene tetrahydrophthalic acid; hexachloroendomethylene tetrahydrophthalic anhydride and the like.

As polyhydric alcohols which may be used in the preparation of the polymerizable unsaturated polyesters of the present invention, it is preferred that those alcohols containing only two hydroxy groups be used. However, those alcohols containing three, four, or more hydroxy groups may be used in minor amounts. Illustrative examples of the various dihydroxy alcohols that find employment in our invention are: ethylene glycol, diethylene glycol, propylene glycol, dipropylene glycol, butanediol-1,4-butanediol-1,3, butanediol-1,2, pentanediol-1,4, pentanediol-1,5, hexanediol-1,6, and the like. Polyglycols, such as polyethylene glycol, polypropylene glycol, polybutylene glycol, and the like may be employed. Polyhydric alcohols, as glycerol, pentaerythritol, dipentaerythritol, and the like may also be used in our invention.

Illustrative examples of halogenated polyhydric alcohols that may be used in our invention are 3,4-dibromo-3-chloro-1,2-butanediol; 2,3-dibromo-1,4-butanediol; 1,4-dichloro-2,3-butanediol; 1,4-diiodo-2,3-butanediol; 5-chloro-1,2-pentanediol; 1,5,5,5-tetrachloro-1,3-pentanediol; 2-chloro-1,5-pentanediol and the like.

Illustrative of the benzophenone compounds of the general formula which may be employed to impart light stability to the reaction product are such as 2-hydroxy-4-methoxybenzophenone; 2,2'-dihydroxy-4,4'-dimethoxybenzophenone; 2,2'-dihydroxy-4,4'-diethoxybenzophenone; 2,2'-dihydroxy-4,4'-dibutoxybenzophenone; 2,2'-dihydroxy-4-methoxy-4'-ethoxybenzophenone; 2,2'-dihydroxy-4-methoxy-4'-propoxybenzophenone; 2,2'-dihydroxy-4-methoxy-4'-butoxybenzophenone; 2,2'-dihydroxy-4-ethoxy-4'-propoxybenzophenone; 2,2'-dihydroxy-4-ethoxy-4'-butoxybenzophenone; 2,3'-dihydroxy-4,4'-dimethoxybenzophenone; 2,3'-dihydroxy-4-methoxy-4'-butoxybenzophenone; 2-hydroxy-4,4',5'-trimethoxy-benzophenone; 2-hydroxy-4,4',6'-tributoxybenzophenone; 2-hydroxy-4-butoxy-4,5'-dimethoxybenzophenone; 2-hydroxy-4-ethoxy-2'4'-dibutylbenzophenone; 2-hydroxy-4-propoxy-4',6'-dichlorobenzophenone; 2-hydroxy-4-propoxy-4'6'-dibromobenzophenone; 2-hydroxy-4-ethoxy-benzophenone, 2-hydroxy-4-propoxybenzophenone, 2-hydroxy-4-butoxybenzophenone, 2-hydroxy-4-methoxy-4'-methylbenzophenone, 2-hydroxy-4-methoxy-4'-ethylbenzophenone, 2-hydroxy-4-methoxy-4'-propylbenzophenone, 2-hydroxy-4-methoxy-4'-butylbenzophenone, 2-hydroxy-4-methoxy-4'-chlorobenzophenone, 2-hydroxy-4-methoxy-4'-bromobenzophenone, 2-hydroxy-4,4'-dimethoxybenzophenone, 2-hydroxy-4,4'-dimethoxy-3-methylbenzophenone, 2-hydroxy-4,4'-dimethoxy-2'-ethylbenzophenone, 2-hydroxy-4,4',5'-trimethoxybenzophenone, 2-hydroxy-4-ethoxy-4'-methylbenzophenone, 2-hydroxy-4-ethoxy-4'-ethylbenzophenone, 2-hydroxy-4-ethoxy-4'-propylbenzophenone, 2-hydroxy-4-ethoxy-4'-butylbenzophenone, 2-hydroxy-4-ethoxy-4'-methoxybenzophenone, 2-hydroxy-4,4'-diethoxybenzophenone, 2-hydroxy-4-ethoxy-4'-propoxybenzophenone, 2-hydroxy-4-ethoxy-4'-butoxybenzophenone, 2-hydroxy-4-ethoxy-4'-chlorobenzophenone, 2-hydroxy-4-ethoxy-4'-bromobenzophenone, and the like. From this illustration of compounds which are representative of the class which may be used in the invention in the present application, there may be used as substituents in the 2', 3', 4', 5', and 6' position, either methyl, ethyl, propyl, or butyl, or methoxy, ethoxy, propoxy, or butoxy, or any of the halo groups, namely chloro, bromo, or iodo.

In the preparation of the polymerizable unsaturated polyesters, one may use the polyhydric alcohols and the polycarboxylic acids in a proportion substantially mol for mol and preferably an excess of alcohol approximating 15% above the stoichiometric quantity required for complete esterification. If polyhydric alcohols containing more than two hydroxy groups are used, calculation of the molar proportion should be made on a stoichiometric basis so as to make allowance for the additional hydroxy groups, such as those found in glycerol, pentaerythritol, and the like. This is also true when polycarboxylic acids having more than two carboxyl groups are employed. A sufficient quantity of the alcohol and acid should be reacted so as to produce an ultimate polyester resinous material having an acid number not greater than about 55 and not lower than about 20 and preferably an acid number from about 35 to 40. The combined halogen content of the polyester resins should be from about 5% to about 50% and preferably from about 25% to 35% by weight.

The polymerizable unsaturated polyesters are admixed with a monomeric compound containing the polymerizable $CH_2=C<$ group to give a composition that may be cured to a stable thermoset condition. One may use about 10 parts by weight of the monomeric material to about 90 parts of the unsaturated polyester resin up to about 50 parts of the monomeric material to about 50 parts of the polymerizable unsaturated polyester resin. The preferred embodiment however, is to use from about 25 parts of the monomeric material to about 35 parts of the monomeric material with about 75 parts to about 65 parts of the polymerizable unsaturated polyester resin.

The monomeric material containing the polymerizable $CH_2=C<$ group has a boiling point of at least 60° C. among the polymerizable monomeric materials that may find use in our invention are such as styrene, side-chain alkyl and halo-substituted styrenes, such as alpha methylstyrene, alpha chlorostyrene, alpha ethylstyrene, and the like, or alkyl and halo ring-substituted styrene, such as ortho, meta- and para-alkylstyrenes, such as o-methylstyrene, p-ethylstyrene, meta-propylstyrene, 2,4-dimethylstyrene, 2,5-diethylstyrene, the ortho-, meta-, and para-bromostyrenes and chlorostyrenes, dibromostyrenes, dichlorostyrenes, and the like. Still further, one can make use of the allyl compounds, such as diallyl phthalate, tetrachlorodiallyl phthalate, allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, allyl gluconate, allyl methylgluconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic anhydride, the diallyl ester of tetrachloro endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane, and the like.

To render fire-resistance to the composition of the present invention, it is necessary that alkyl phosphates be coreacted with the polycarboxylic acid and polyhydric alcohol in amounts sufficient to provide from about 0.1% to about 5% of combined phosphorus, preferably from about 0.5% to about 1.5% by weight based on the total weight of the polyester, during the preparation of the polymerizable unsaturated polyester resin, as distinguished from the introduction of phosphorus-containing materials into the polyester resin after the latter had been produced. Post-addition of phosphorus does not impart fire-resistance and the fact that the latter is only a physical mixture is shown by loss in weight of the material when it is subjected to prolonged elevated temperatures.

The present invention deals with polyester resins wherein the alkyl phosphates are chemically combined therein. This is evidenced by the fact that there is no significant weight loss when the resinous materials are exposed at elevated temperatures for long periods. Examples of the alkyl phosphates that may be utilized in the process of our invention are those in which the alkyl group contains from 1 to 4 carbon atoms. Illustrative examples of such compounds are triethyl phosphate, diethyl phosphate, monoethyl phosphate, and the like. The alkyl group has been set forth as the ethyl radical, but it will be understood that the alkyl group may be such as methyl, propyl, butyl, isopropyl, isobutyl, tertiarybutyl, and the like. The amount of alkyl phosphate reacted is such that the polyester contains from about 0.1% to about 5% of combined phosphorus, preferably from about 0.5% to about 1.5% by weight based on the total weight.

Upon combining halogenated and phosphorus compounds into the resinous composition to impart fire-resistance thereto, it has been found that considerable discoloration occurs when the cured composition is exposed to moisture, heat, and sunlight. We have found that the major factor in causing discoloration of fire-resistant resins is heat, although moisture and light also contribute in discoloring these materials. Discoloration, browning, or clouding of these compositions has seriously limited the application of these materials for structural and decorative uses, particularly in the glass-filled corrugated and flat sheeting often employed as wall and ceiling components in buildings.

We have found that the incorporation of an alkaline earth metal salt of a fatty acid having from 8 to 20 carbon atoms imparts remarkable resistance to discoloration without in the least diminishing the fire-resistant characteristic of these resinous materials. The alkaline earth metals contemplated are barium, cadmium, magnesium, and strontium. Marked resistance to discoloration is apparent when amounts from as little as 0.1% and less up to about 10% of these alkaline earth metal salts of fatty acids having 8 to 20 carbon atoms are used. Examples of such compounds include salts of the saturated fatty acids, caprylic, pelargonic, capric, undecylic, lauric, tridecanoic, myristic, pentadecanoic, palmitic, margonic, stearic, nondecylic, and arachidic; the olefine acids, such as hypogaeic, oleic, and the like; and those acids containing a triple bond, such as palmitolic, stearolic, and the like. Preferred results are obtained when these salts in amounts of from 1% to 5% by weight based on the total weight of the resinous composition are employed.

In the formulation of the resinous composition of our invention, it is necessary that a catalyst be present to effect the polymerization of the unsaturated polyester resin and the monomeric material containing the polymerizable $CH_2=C<$ group. It is preferred, as is well known in the art, that a catalyst of the peroxide class be utilized. The amount of the catalyst may vary over rather wide limits, depending upon the desired rate of polymerization of the material. Thus, from about 0.1% to about 10% by weight based on the total weight of the polymerizable composition may be used. Preferably, from about 0.5% to about 1% by weight of the catalyst based on the total weight of the polymerizable resinous composition gives the desired results. It is obvious that other proportions of the catalyst may be utilized when a faster or slower rate of cure is desired. Examples of the organic peroxide catalyst that may be used in our invention are such as benzoyl peroxide, succinyl peroxide, lauroyl peroxide, acetyl peroxide, perbenzoic acid, peracetic acid, anisoyl peroxide, toluyl peroxide, p-bromobenzoyl peroxide, furoyl peroxide, and chloracetyl peroxide; hydroperoxides, such as cumene hydroperoxide, tertiary butyl hydroperoxide, and the like; or any organic ozonide, such as di-isopropylene ozonide, diisobutylene ozonide, or a mixture of such substances, may be used as the curing catalyst.

If it is desired to effect low temperature cure of the unsaturated polyester resinous composition, it will be desirable to make use of a material commonly referred to as a promoter. These promoters, such as the mercaptans, the alkyl substituted anilines, and the metallic salt driers, e. g., cobalt naphthalate are generally dispersed in a solution of a suitable solvent material, such as the monomeric polymerizable material. If high temperature cure is to be accomplished, a promoter is not necessary. Promoters which are useful in this connection have been disclosed in prior art as represented by such patents as U. S. 2,466,800 and 2,480,928.

In order to inhibit premature cure during handling and/or shipping and also to control the rate of polymerization during the cure of the resinous composition of our invention, it is advantageous to add a moderate amount of an inhibiting agent to the resinous composition. The amount of inhibiting agent used is that required to give the desired degree of inhibiting effect. Examples of inhibiting agents that may be used in our invention are quinone, naphthaquinone, hydroquinone, ditertiary butyl hydroquinone, ditertiary butyl paracersol, pyrogallol, catechol, tertiary butyl catechol, 2,2'-methylene bis (4-methyl-6-tertiary butyl phenol), dinitro ortho cresol, p-amino phenol HCl, butylated hydroxy anisole, monobutyl meta cresol, tannic acid, and the like, and aromatic amines, such as aniline or phenylene diamine. Mixtures of the inhibiting agents may also be used, if desired. About 0.008% of inhibiting agent by weight based on the total weight of the resinous composition usually gives satisfactory results.

In order to demonstrate the self-extinguishing properties of the material, the following standard underwriters' test was carried out:

A 1-inch by 9-inch glass-filled laminate is exposed to a 5-inch flame from a Bunsen burner, the tip of the inner flame being 1 inch long. The flame is exposed at an angle of 45° to the laminate one inch from its bottom for 30 seconds. The flame is then removed and the time required for the flame to extinguish itself is recorded. The flame, in the burning of the material, must extinguish itself in 20 seconds to be acceptable.

The standard burning rate as set forth by the specifications of ASTM D757-49 was also carried out. The specifications for this test are:

An igniting bar is heated to 950° C. by alternating or direct current, the electrical input of which is adjusted to 350±20 watts. A test specimen 5 inches by ½ inch by ⅛ inch is clamped in a holder with its length horizontal and at right angle to the axis of the igniting bar and its width in a vertical plane. The length of the specimen free to burn is 4 inches. The front end of the specimen is brought into contact with the igniting bar and allowed to remain in this position for 3 minutes. After 3 minutes, any flaming shall be extinguished, the specimen removed, and the length burned measured. The length burned divided by 3 then gives the burning rate in inches per minute.

The self-extinguishing test as set forth in the ASTM specifications D635-44 was also carried out. The specifications for this test are:

A test specimen 6 inches in length by ½ inch in width and of the thickness of the material as normally used is clamped in a support with its longitudinal axis horizontal and its traverse axis inclined at 45° to the horizontal. A Bunsen burner with a flame ½ inch to ¾ inch in height is placed under the free end of the specimen and adjusted so that the flame tip is just in contact therewith. At the end of 30 seconds, the flame is removed and the specimen allowed to burn. A stop watch is started when the flame reaches the first mark, 1 inch from the end, and the time noted when the flame reaches the 5-inch mark. In case the specimen does not continue to burn after the first ignition, the burner is placed under the free end for a second period of 30 seconds immediately following the extinction of the flame. If the specimen does not continue to burn to the 5-inch mark after the second ignition, it is reported as self-extinguishing.

In ascertaining the resistance to discoloration, specimens are exposed to a light treatment and weatherometer test. The interval in hours before discoloration, amounting to a 10% reduction in light reflectance, is regarded as the measure of resistance.

For the light test to determine yellowing and fading, a specimen is exposed to a sunlamp until a stage is reached where the decrease in light reflection is 10% according to the procedure of ASTM Designation D620–49.

This procedure is used to evaluate the relative resistance of the resinous composition to change in color when exposed to sunlight.

A description of the apparatus employed follows:

Lamp—A General Electric Sunlamp, Model BM 12, with reflector approximately 15 inches in diameter.
Disc—A phonograph turntable operating at 33 R. P. M. 17-inch diameter disc with suitable mounting rack.
Test specimen—2 inches by 1 inch by ⅛ inch mounted flat on a table with long direction pointing in toward center of table and with the place of the sample 5 inches from the bottom of the bulb. Test temperature is 55° C. to 60° C.

The weatherometer test, wherein the specimen is exposed to alternate periods of heating and concurrent heating and wetting, is made according to the following procedure:

A test specimen 2¼ inches by 6 inches by ⅛ inch is mounted in a suitable apparatus equipped with a carbon arc lamp and water spray. A circular rack 30 inches in diameter, which holds the specimens, rotates around the carbon arc lamp at 1 R. P. M. providing uniform distribution of the radiation on all specimens. A decrease in light reflectance of 10% is recorded as failure of the specimen.

Adequate ventilation is provided in the test chamber to prevent contamination of the specimens from products of combustion of the arc.

The apparatus employed in this test has the following specifications:

Line voltage _____ 208–250 volts.
Arc volts _____ 120–145 volts.
Arc current _____ 15–17 amps.
Carbon electrodes _____ ½″ by 12″ neutral cored upper; ½″ by 4″ neutral cored upper.

A globe of optical heat-resistant glass with cutoff at 2750 angstroms with an increase in transmission to 91% at 3700 angstroms.

Water is arranged to strike the test specimens in the form of a fine spray equally distributed over the specimens under the following operating conditions: 102 min. of light, 18 min. of light and water, temperature 145° F.±5° F., black panel temperature.

In order that the inventive concept herein disclosed may be more fully understood, examples are given by way of illustration only and any specific enumeration of details should not be interpreted as a limitation, except as expressed in the appended claims. All parts are parts by weight unless otherwise indicated.

EXAMPLE 1

92.5 parts of ethylene glycol, 67.0 parts of maleic anhydride and 265 parts of hexachloroendomethylene tetrahydrophthalic acid are charged into a suitable reaction vessel equipped with mechanical stirrer, thermometer, inlet and outlet tubes. The batch is heated under an inert atmosphere of carbon dioxide at a temperature of 145° C. to 155° C. until an acid number of 150 to 160 is reached. 25.5 parts of triethyl phosphate is added to the hot reaction mixture and the temperature is raised to 160° C. to 170° C. and is held at an acid number of 35 to 40 until a viscosity of N–Q on the Gardner-Holdt scale at 25° C. is reached. Thereafter, the batch is cooled to 150° C. and 0.008% hydroquinone, calculated on the basis of 72:28 alkyd to styrene weight ratio, respectively, is added as a 5% solution in dibutyl phthalate. The reaction product is cooled to a temperature between 110° C. to 120° C. and styrene is added in amounts of about 25% to about 75% by weight of the polyester reaction product. The mixture is then cooled to 70° C. to 60° C. and the alkaline metal-organic acid salt stabilizer is added in the following manner: Mixed barium laurate and cadmium laurate in the ratio of 3:2, respectively, so as to provide a content of 3% by weight of the polyester-styrene mixture is made into a 40% paste by first mixing the salt with a portion of the polyester-styrene mixture and then adding this paste to the main portion of the resin with vigorous mixing. Mixing is continued until the mass exhibits a uniform, slightly hazy appearance and no particles large enough to be visible to the eye are evident in the resin. The resin is not filtered after addition of stabilizer, as this apparently removes part of the stabilizer and results in a resin of relatively poorer color stability. The resin is then cooled below 40° C. and 1% by weight based on the total resin of ultraviolet absorber, 2-hydroxy, 4-methoxy benzophenone, is added as a 25% solution in styrene. In order that the final alkyd-styrene ratio for this resin may have a ratio of 72:28, respectively, the initial cut of 75% polyester to 25% styrene monomer is used, so that the styrene added with the ultraviolet absorber will produce a final ratio of 78:28±1.5%, respectively.

The final product has a Brookfield viscosity of 4.5 to 6.5 poises and a viscosity on the Gardner Holdt scale of between R and U (4.70 to 6.27 poises). The resinous composition has a stability exceeding five days at temperatures exceeding 130° F. It has very good sunlight resistances, self-extinguishing characteristics, and low burning rate.

EXAMPLE 2

A resin is made according to the procedure of Example 1 but without the barium-cadmium laurate stabilizer.

The results obtained in testing the discoloration of the resins of Example 1, wherein the alkaline metal salt of organic acid is used as a heat stabilizer according to the teaching of the present invention and of Example 2, where no heat stabilizer is employed are compared in Table 1. The heat and moisture resistance imparted to polyester-styrene compositions with other stabilizers is shown by the data for Examples 3 through 11, set out in Table 1. The procedure and formulation employed is that of Example 1 with the exception of the stabilizer, which is that indicated in Table 1. Examples 3 through 7 illustrate the effect of employing stabilizers of the invention. Examples 7 through 11 illustrate the use of stabilizing compounds which fall outside the class of alkaline metal stabilizers contemplated by the teaching of the instant invention.

Table 1

| Example | Stabilizer | Amount of Stabilizer, percent | Hours of Exposure (Heat and Moisture) until Failure |
|---|---|---|---|
| 1 | Barium-Cadmium Laurate (3:2 ratio). | 3.0 | 1,400 |
| 2 | 0 | | 200 |
| 3 | Barium laurate | 3.0 | 960 |
| 4 | Cadmium laurate | 3.0 | 500 |
| 5 | Barium-Cadmium stearate | 3.0 | 540 |
| 6 | Cadmium Octoate | 3.0 | 710 |
| 7 | Barium-Cadmium myristate | 3.0 | 560 |
| 8 | Dibutyl tin Maleate | 3.0 | 260 |
| 9 | Lead stearate | 3.0 | 140 |
| 10 | Dibasic lead stearate | 3.0 | 270 |
| 11 | Triaryl Phosphate | 3.0 | 140 |

The foregoing results demonstrate that discoloration is markedly improved when the stabilizers of the present invention are incorporated into the resins. The results obtained are particularly impressive when it is considered that under the rigorous conditions of the testing procedures employed, each hour of increase in resistance is indicative of improved outdoor durability. A further advantage of the resinous compositions using the alkaline metal-organic acid salt stabilizers of the instant invention resides in the improvement in gloss-retention properties of these materials. After a 3-month-outdoor exposure, the improvement in gloss of the composition of Example 1 over that of Example 2 was approximately 20%.

We claim:

1. A clear, flame-resistant self-extinguishing resinous composition resistant to discoloring effects of heat and light, comprising the reaction product of (1) a polymerizable ethylenically unsaturated polycarboxylic acid-polyhydric alcohol-alkyl phosphate polyester obtained as the reaction product of a polyhydric alcohol and an ethylenically unsaturated polycarboxylic acid wherein said polyester contains a halogenated member selected from the group consisting of a halogenated polyhydric alcohol and a halogenated polycarboxylic acid in which the halo group is a member of the group consisting of chlorine, bromine and iodine and is present in an amount to yield from about 5% to about 50% by weight of said product and an alkyl phosphate wherein the alkyl group contains from 1 to 4 carbon atoms and is present in an amount to yield from about 0.1% to about 5% by weight of said product, (2) a polymerizable monomer containing a polymerizable $CH_2=C<$ group and having a boiling point of at least 60° C., (3) from 0.1% to 10% based on the total weight of (1) and (2) of an alkaline earth metal salt of fatty oil acids having from 8 to 20 carbon atoms, (4) from about 0.01% to about 5% by weight based on the total weight of (1) and (2) of a compound having the general formula

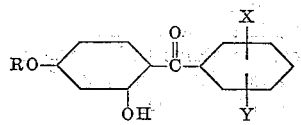

wherein "R" is an alkyl group having from 1 to 4 carbon atoms, "X" is a member selected from the group consisting of hydrogen, halo groups, alkyl groups having from 1 to 4 carbon atoms and alkoxy groups having from 1 to 4 carbon atoms and "Y" is a member selected from the group consisting of hydrogen, hydroxyl groups, halo groups, alkyl groups having from 1 to 4 carbon atoms and alkoxy groups having from 1 to 4 carbon atoms, and (5) an organic polymerization catalyst selected from the group consisting of organic peroxides and organic ozonides.

2. A clear, flame-resistant self-extinguishing resinous composition resistant to discoloring effects of heat and light comprising the reaction product of (1) a polymerizable ethylenically unsaturated polycarboxylic acid-polyhydric alcohol-alkyl phosphate polyester obtained as the reaction product of a polyhydric alcohol and an ethylenically unsaturated polycarboxylic acid wherein said polyester contains a halogenated member selected from the group consisting of a halogenated polyhydric alcohol and a halogenated polycarboxylic acid in which the halo group is a member of the group consisting of chlorine, bromine and iodine and is present in an amount to yield from about 25% to about 35% by weight of said product and an alkyl phosphate wherein the alkyl group contains from 1 to 4 carbon atoms and is present in an amount to yield from about 0.5% to about 1.5% by weight of said product, (2) a polymerizable monomer containing a polymerizable $CH_2=C<$ group and having a boiling point of at least 60° C., (3) from about 1% to 5% based on the total weight of (1) and (2) of an alkaline earth metal salt of fatty oil acids having from 8 to 20 carbon atoms, (4) from about 0.1% to about 2% by weight based on the total weight of (1) and (2) of a compound having the general formula

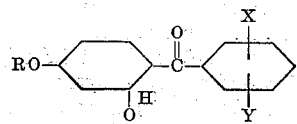

wherein "R" is an alkyl group having from 1 to 4 carbon atom, "X" is a member selected from the group consisting of hydrogen, halo groups, alkyl groups having from 1 to 4 carbon atoms and alkoxy groups having from 1 to 4 carbon atoms and "Y" is a member selected from the group consisting of hydrogen, hydroxyl groups, halo groups, alkyl groups having from 1 to 4 carbon atoms and alkoxy groups having from 1 to 4 carbon atoms, and (5) an organic peroxide polymerization catalyst.

3. A clear, flame-resistant self-extinguishing resinous composition resistant to the discoloring effects of heat and light comprising the reaction product of (1) a polymerizable ethylenically unsaturated polycarboxylic acid-polyhydric alcohol-alkyl phosphate polyester obtained as the reaction product of a polyhydric alcohol and an ethylenically unsaturated polycarboxylic acid wherein said polyester contains a halogenated member selected from the group consisting of a halogenated polyhydric alcohol and a halogenated polycarboxylic acid in which the halo group is a member of the group consisting of chlorine, bromine and iodine and is present in an amount to yield from about 5% to 50% by weight of said product and an alkyl phosphate wherein the alkyl group contains from 1 to 4 carbon atoms and is present in an amount to yield from about 0.1% to 5% phosphorus by weight of said product, (2) a polymerizable monomer containing a polymerizable $CH_2=C<$ group and having a boiling point of at least 60° C., (3) from 0.1% to 10% based on the total weight of (1) and (2) of an alkaline earth metal salt of fatty oil acids having from 8 to 20 carbon atoms, (4) from about 0.01% to 5% by weight based on the total weight of 2-hydroxy-4-methoxybenzophenone, and (5) an organic peroxide polymerization catalyst.

4. A clear, flame-resistant self-extinguishing resinous composition resistant to the discoloring effects of heat and light comprising the reaction product of (1) a polymerizable ethylenically unsaturated polycarboxylic acid-polyhydric alcohol-alkyl phosphate polyester obtained as the reaction product of a polyhydric alcohol and an ethylenically unsaturated polycarboxylic acid wherein said polyester contains a halogenated member selected from the group consisting of a halogenated polyhydric alcohol and a halogenated polycarboxylic acid in which the halo group is a member of the group consisting of chlorine, bromine and iodine and is present in an amount to yield from about 25% to 35% by weight of said product and an alkyl phosphate wherein the alkyl group contains from 1 to 4 carbon atoms and is present in an amount to yield from about 0.5% to about 1.5% phosphorus by weight of said product, (2) a polymerizable monomer containing a polymerizable $CH_2=C<$ group and having a boiling point of at least 60° C., (3) from 1% to 5% based on the total weight of (1) and (2) of an alkaline earth metal salt of fatty oil acids having from 8 to 20 carbon atoms, (4) from about 0.1% to about 2% by weight based on the total weight of 2-hydroxy-4-methoxybenzophenone, and (5) an organic peroxide polymerization catalyst.

5. A clear, flame-resistant self-extinguishing resinous composition resistant to the discoloring effects of heat and light comprising the reaction product of (1) a polymerizable ethylenically unsaturated polycarboxylic acid-polyhydric alcohol-alkyl phosphate polyester obtained as the reaction product of a polyhydric alcohol and an ethylenically unsaturated polycarboxylic acid wherein said polyester contains a halogenated member selected from the group consisting of a halogenated polyhydric alcohol and a halogenated polycarboxylic acid in which the halo group is a member of the group consisting of chlorine, bromine and iodine and is present in an amount to yield from about 25% to about 35% by weight of said product and triethyl phosphate wherein the alkyl group contains from 1 to 4 carbon atoms and is present in an amount to yield from about 0.5% to about 1.5% phosphorus by weight of said product, (2) a styrene having a boiling point of at least 60° C., (3) from about 1% to about 5% based on the total weight of (1) and (2) of a mixed salt of barium laurate and cadmium laurate, (4) from about 0.1% to about 2% by weight based on the total weight of 2-hydroxy-4-methoxybenzophenone, and (5) an organic peroxide polymerization catalyst.

6. A method for producing a clear, flame-resistant self-extinguishing resinous composition resistant to the discoloring effects of heat and light which comprises preparing a polymerizable composition comprising (1) a polymerizable ethylenically unsaturated polycarboxylic acid-polyhydric alcohol-alkyl phosphate polyester obtained as the reaction product of a polyhydric alcohol and an ethylenically unsaturated polycarboxylic acid wherein said polyester contains a halogenated member selected from the group consisting of a halogenated polyhydric alcohol and a halogenated polycarboxylic acid in which the halo group is a member of the group consisting of chlorine, bromine and iodine and is present in an amount to yield from about 25% to about 35% by weight of said product and an alkyl phosphate wherein the alkyl group contains from 1 to 4 carbon atoms and is present in an amount to yield from about 0.5% to about 1.5% by weight of said product and (2) a polymerizable monomer containing a polymerizable $CH_2=C<$ group and having a boiling point of at least 60° C.; thereafter intimately and rapidly blending therein from about 1% to 5% based on the total weight of (1) and (2) of an alkaline earth metal salt of an fatty oil acid having from 8 to 20 carbon atoms and from about 0.1% to about 2% by weight based on the total weight of (1) and (2) of a compound having the general formula

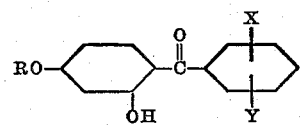

wherein "R" is an alkyl group having from 1 to 4 carbon atoms, "X" is a member selected from the group consisting of hydrogen, halo groups, alkyl groups having from 1 to 4 carbon atoms and alkoxy groups having from 1 to 4 carbon atoms and "Y" is a member selected from the group consisting of hydrogen, hydroxyl groups, halo groups, alkyl groups having from 1 to 4 carbon atoms and alkoxy groups having from 1 to 4 carbon atoms and contacting said polymerizable composition with an organic polymerization catalyst selected from the group consisting of organic peroxides and organic ozonides.

7. A method for producing a clear, flame-resistant self-extinguishing resinous composition resistant to the discoloring effects of heat and light which comprises preparing a polymerizable composition comprising (1) a polymerizable ethylenically unsaturated polycarboxylic acid-polyhydric alcohol-alkyl phosphate polyester wherein said polyester contains a halogenated member selected from the group consisting of a halogenated polyhydric alcohol and a halogenated polycarboxylic acid in which the halo group is a member of the group consisting of chlorine, bromine and iodine and is present in an amount to yield from about 25% to about 35% by weight of said product and an alkyl phosphate wherein the alkyl group contains from 1 to 4 carbon atoms and is present in an amount to yield from about 0.5% to about 1.5% by weight of said product and (2) a polymerizable monomer containing a polymerizable $CH_2=C<$ group and having a boiling point of at least 60° C.; thereafter intimately and rapidly blending therein from about 1% to 5% based on the total weight of (1) and (2) of a mixed barium-cadmium salt of a fatty oil acid having from 8 to 20 carbon atoms and adding thereto from about 0.1% to about 2% by weight based on the total weight of (1) and (2) of a compound having the general formula

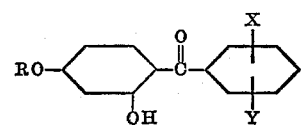

wherein "R" is an alkyl group having from 1 to 4 carbon atoms, "X" is a member selected from the group consisting of hydrogen, halo groups, alkyl groups having from 1 to 4 carbon atoms and alkoxy groups having from 1 to 4 carbon atoms and "Y" is a member selected from the group consisting of hydrogen, hydroxyl groups, halo groups, alkyl groups having from 1 to 4 carbon atoms and alkoxy groups having from 1 to 4 carbon atoms and contacting said polymerizable composition with an organic peroxide polymerization catalyst.

8. A method for producing a clear, flame-resistant self-extinguishing resinous composition resistant to the discoloring effects of heat and light which comprises preparing a polymerizable composition comprising (1) a polymerizable ethylenically unsaturated polycarboxylic acid-polyhydric alcohol-alkyl phosphate polyester obtained as the reaction product of a polyhydric alcohol and an ethylenically unsaturated polycarboxylic acid wherein said polyester contains a halogenated member selected from the group consisting of a halogenated polyhydric alcohol and a halogenated polycarboxylic acid in which the halo group is a member of the group consisting of chlorine, bromine and iodine and is present in an amount to yield from about 25% to about 35% by weight of said product and an alkyl phosphate wherein the alkyl group contains from 1 to 4 carbon atoms and is present in an amount to yield from about 0.5% to about 1.5% by weight of said product and (2) styrene; thereafter intimately blending therein about 3% by weight based on the total weight of (1) to (2) of a mixture of barium laurate and cadmium laurate in the weight ratio of 3:2, respectively; adding thereto from about 0.1% to about 2% by weight based on the total weight of 2-hydroxy-4-methoxybenzophenone and contacting said polymerizable composition with an organic polymerization catalyst selected from the group consisting of organic peroxides and organic ozonides.

9. A clear, flame-resistant self-extinguishing resinous composition resistant to discoloring effects of heat and light comprising the polymerizable mixture of (1) a polymerizable ethylenically unsaturated polycarboxylic acid-polyhydric alcohol-alkyl phosphate polyester obtained as the reaction product of a polyhydric alcohol and an ethylenically unsaturated polycarboxylic acid wherein said polyester contains a halogenated member selected from the group consisting of a halogenated polyhydric alcohol and a halogenated polycarboxylic acid in which the halo group is a member of the group consisting of chlorine, bromine and iodine and is present in an amount to yield from about 5% to about 50% by weight of said product and an alkyl phosphate wherein the alkyl group contains from 1 to 4 carbon atoms and is present in an amount to yield from about 0.1% to about 5% by weight of said product, (2) a polymerizable monomer containing a polymerizable $CH_2=C<$ group and having a boiling point of at least 60° C., (3) from about 0.1% to about 10% based on the total weight of (1) and (2) of an alkaline earth metal salt of fatty oil acids having from 8 to 20 carbon atoms, (4) from about 0.01% to about 5% by weight based on the total weight of (1) and (2) of a light stabilizing compound having the general formula

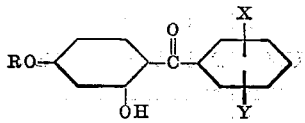

wherein "R" is an alkyl group having from 1 to 4 carbon atoms, "X" is a member selected from the group consisting of hydrogen, halo groups, alkyl groups having from 1 to 4 carbon atoms and alkoxy groups having from 1 to 4 carbon atoms and "Y" is a member selected from the group consisting of hydrogen, hydroxyl groups, halo groups, alkyl groups having from 1 to 4 carbon atoms and alkoxy groups having from 1 to 4 carbon atoms, and (5) a polymerization inhibitor for said mixture.

10. A clear, flame-resistant self-extinguishing resinous composition resistant to the discoloring effects of heat and light comprising the polymerizable mixture of (1) a polymerizable ethylenically unsaturated polycarboxylic acid-polyhydric alcohol-alkyl phosphate polyester obtained as the reaction product of a polyhydric alcohol and an ethylenically unsaturated polycarboxylic acid wherein said polyester contains a halogenated member selected from the group consisting of a halogenated polyhydric alcohol and a halogenated polycarboxylic acid in which the halo group is a member of the group consisting of chlorine, bromine and iodine and is present in an amount to yield from about 25% to about 35% by weight of said product and an alkyl phosphate wherein the alkyl group contains from 1 to 4 carbon atoms and is present in an amount to yield from about 0.5% to about 1.5% phosphorus by weight of said product, (2) styrene, (3) from 1% to 5% of an alkaline earth metal salt of fatty oil acids having from 8 to 20 carbon atoms, (4) from about 0.1% to about 2% by weight based on the total weight of (1) and (2) of a compound having the general formula

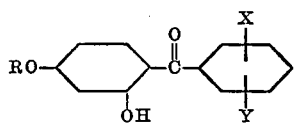

wherein "R" is an alkyl group having from 1 to 4 carbon atoms, "X" is a member selected from the group consisting of hydrogen, halo groups, alkyl groups having from 1 to 4 carbon atoms and alkoxy groups having from 1 to 4 carbon atoms and "Y" is a member selected from the group consisting a hydrogen, hydroxyl groups, halo groups, alkyl groups having from 1 to 4 carbon atoms and alkoxy groups having from 1 to 4 carbon atoms, and (5) a polymerization inhibitor for said mixture.

11. A clear, flame-resistant self-extinguishing resinous composition resistant to the discoloring effects of heat and light comprising the polymerizable mixture of (1) a polymerizable ethylenically unsaturated polycarboxylic acid-polyhydric alcohol-alkyl phosphate polyester obtained as the reaction product of a polyhydric alcohol and an ethylenically unsaturated polycarboxylic acid where said polyester contains a halogenated member selected from the group consisting of a halogenated polyhydric alcohol and a halogenated polycarboxylic acid in which the halo group is a member of the group consisting of chlorine, bromine and iodine and is present in an amount to yield from about 5% to 50% by weight of said product and an alkyl phosphate wherein the alkyl group contains from 1 to 4 carbon atoms and is present in an amount to yield from about 0.1% to about 5% phosphorus by weight of said product, (2) styrene, (3) from about 0.1% to about 10% based on the total weight of (1) and (2) of an alkaline earth metal salt of fatty oil acids having from 8 to 20 carbon atoms, (4) from about 0.01% to about 5% by weight based on the total weight of 2-hydroxy-4-methoxybenzophenone, and (5) a polymerization inhibitor for said mixture.

12. A clear, flame-resistant self-extinguishing resinous composition resistant to the discoloring effects of heat and light comprising the polymerizable mixture of (1) a polymerizable ethylenically unsaturated polycarboxylic acid-polyhydric alcohol-alkyl phosphate polyester obtained as the reaction product of a polyhydric alcohol and an ethylenically unsaturated polycarboxylic acid wherein said polyester contains a halogenated member selected from the group consisting of a halogenated polyhydric alcohol and a halogenated polycarboxylic acid in which the halo group is a member of the group consisting of chlorine, bromine and iodine and is present in an amount to yield from about 25% to about 35% by weight of said product and an alkyl phosphate wherein the alkyl group contains from 1 to 4 carbon atoms and is present in an amount to yield from about 0.5% to about 1.5% phosphorus by weight of said product, (2) styrene, (3) from 1% to 5% of an alkaline earth metal salt of fatty oil acids having from 8 to 20 carbon atoms, (4) from about 0.1% to about 2% by weight based on the total weight of 2-hydroxy-4-methoxybenzophenone, and (5) a polymerization inhibitor for said mixture.

13. A clear, flame-resistant self-extinguishing resinous composition resistant to the discoloring effects of heat and light comprising the polymerizable mixture of (1) a polymerizable ethylenically unsaturated polycarboxylic acid-polyhydric alcohol-alkyl phosphate polyester obtained as the reaction product of a polyhydric alcohol and an ethylenically unsaturated polycarboxylic acid wherein said polyester contains a halogenated member selected from the group consisting of a halogenated polyhydric alcohol and a halogenated polycarboxylic acid in which the halo group is a member of the group consisting of chlorine, bromine and iodine and is present in an amount to yield from about 25% to about 35% by weight of said product and a triethyl phosphate wherein the alkyl group contains from 1 to 4 carbon atoms and is present in an amount to yield from about 0.5% to about 1.5% phosphorus by weight of said product, (2) styrene, (3) from 1% to 5% based on the total weight of (1) and (2) of a barium-cadmium salt, (4) from about 0.1% to about 2% by weight based on the total weight of 2-hydroxy-4-methoxybenzophenone, and (5) a polymerization inhibitor for said mixture.

14. A clear, flame-resistant self-extinguishing resinous composition resistant to the discoloring effects of heat and light comprising the polymerizable mixture of (1) a polymerizable ethylenically unsaturated polycarboxylic acid-polyhydric alcohol-alkyl phosphate polyester obtained as the reaction product of a polyhydric alcohol and an ethylenically unsaturated polycarboxylic acid wherein said polyester contains a halogenated member selected from the group consisting of a halogenated polyhydric alcohol and a halogenated polycarboxylic acid in which the halo group is a member of the group consisting of chlorine, bromine and iodine and is present in an amount to yield from about 25% to about 35% by weight of said product and an alkyl phosphate wherein the alkyl group contains from 1 to 4 carbon atoms and is present in an amount to yield from about 0.5% to about 1.5% phosphorus by weight of said product, (2) styrene, (3) from 1% to 5% based on the total weight of (1) and (2) of barium laurate and cadmium laurate in the relative weight ratios of 3:2, respectively, (4) from about 0.1% to about 2% by weight based on the total weight of 2-hydroxy-4-methoxybenzophenone, and (5) as a polymerization inhibitor for said mixture, a small but effective amount of hydroquinone.

15. A clear, flame-resistant self-extinguishing resinous composition resistant to the discoloring effects of heat and light comprising the polymerizable mixture of (1) ethylene glycol, maleic anhydride, hexachloroendomethylene tetrahydrophthalic acid in amounts to yield from about 25% to 35% chlorine by weight of said product, and triethyl phosphate in an amount to yield from about 0.5% to about 1.5% phosphorus by weight of said product, (2) styrene, (3) from 1% to 5% based on the total weight of (1) and (2) of barium laurate and cadmium laurate in the relative weight ratios of 3:2, respectively, (4) from about 0.1% to about 2% by weight based on the total weight of 2-hydroxy-4-methoxybenzophenone, and (5) as a polymerization inhibitor for said mixture, 0.008% by weight based on the total weight of the resinous composition of hydroquinone.

References Cited in the file of this patent

UNITED STATES PATENTS

| | | |
|---|---|---|
| 2,075,543 | Reed et al. | Mar. 30, 1953 |
| 2,669,544 | Lowe | Feb. 16, 1954 |
| 2,669,548 | Darby | Feb. 16, 1954 |
| 2,671,064 | Cowell | Mar. 2, 1954 |